(12) United States Patent
Thiebaud et al.

(10) Patent No.: US 6,213,157 B1
(45) Date of Patent: Apr. 10, 2001

(54) SUBMARINE PIPELINE FOR TRANSPORTING PETROLEUM PRODUCTS

(75) Inventors: François Eugène Paul Thiebaud, Breuillet; Christophe André Marcel Thibaudeau, Paris, both of (FR)

(73) Assignees: Doris Engineering, Paris; Stolt Comex Seaway, Marseille Cedex, both of (FR)

(*) Notice: Subject to any disclaimer, the term of this patent is extended or adjusted under 35 U.S.C. 154(b) by 0 days.

(21) Appl. No.: 09/546,530

(22) Filed: Apr. 10, 2000

Related U.S. Application Data

(63) Continuation of application No. PCT/FR98/02154, filed on Oct. 8, 1998.

(30) Foreign Application Priority Data

Oct. 10, 1997 (FR) .................................................. 97 12685

(51) Int. Cl.$^7$ ...................................................... F16L 9/14
(52) U.S. Cl. ............................. 138/149; 138/33; 138/112; 405/158
(58) Field of Search .................................. 138/149, 112, 138/117, 33; 405/157, 158, 171

(56) References Cited

U.S. PATENT DOCUMENTS

| 3,317,074 | * | 5/1967 | Barker, Jr et al. . | |
|---|---|---|---|---|
| 3,547,161 | | 12/1970 | Reece et al. . | |
| 4,162,093 | * | 7/1979 | Sigmund | 138/149 |
| 4,194,536 | * | 3/1980 | Stine et al. | 138/149 |
| 4,231,436 | * | 11/1980 | Waller | 138/149 |
| 4,393,901 | * | 7/1983 | Beck | 138/149 |
| 4,590,971 | * | 5/1986 | Webster et al. | 138/149 |
| 4,660,861 | * | 4/1987 | Argy et al. | 138/149 |
| 4,824,705 | * | 4/1989 | Persson et al. | 138/149 |
| 4,921,018 | * | 5/1990 | Pridi et al. | 138/149 |
| 4,963,420 | * | 10/1990 | Jarrin et al. | 138/111 |
| 5,795,102 | * | 8/1998 | Corbishley | 138/149 |
| 5,871,034 | * | 2/1999 | Sumner | 138/149 |
| 6,012,495 | * | 1/2000 | Antonsen | 405/158 |
| 6,058,979 | * | 5/2000 | Watkins | 138/149 |

FOREIGN PATENT DOCUMENTS 0 400 689   12/1990   (EP) .
0 779 467   6/1997    (EP) .
2 174 271   10/1973   (FR) .

* cited by examiner

Primary Examiner—James Hook
(74) Attorney, Agent, or Firm—Young & Thompson

(57) ABSTRACT

A pipeline comprises flow lines in which petroleum products flow and a protective carrier pipe around the flow lines. It further comprises a buoyancy module made of a thermally insulative material that is mechanically resistant to the hydrostatic pressure at the underwater site at which the pipeline is installed, the module providing the buoyancy required for installing the pipeline, in an economical manner.

12 Claims, 1 Drawing Sheet

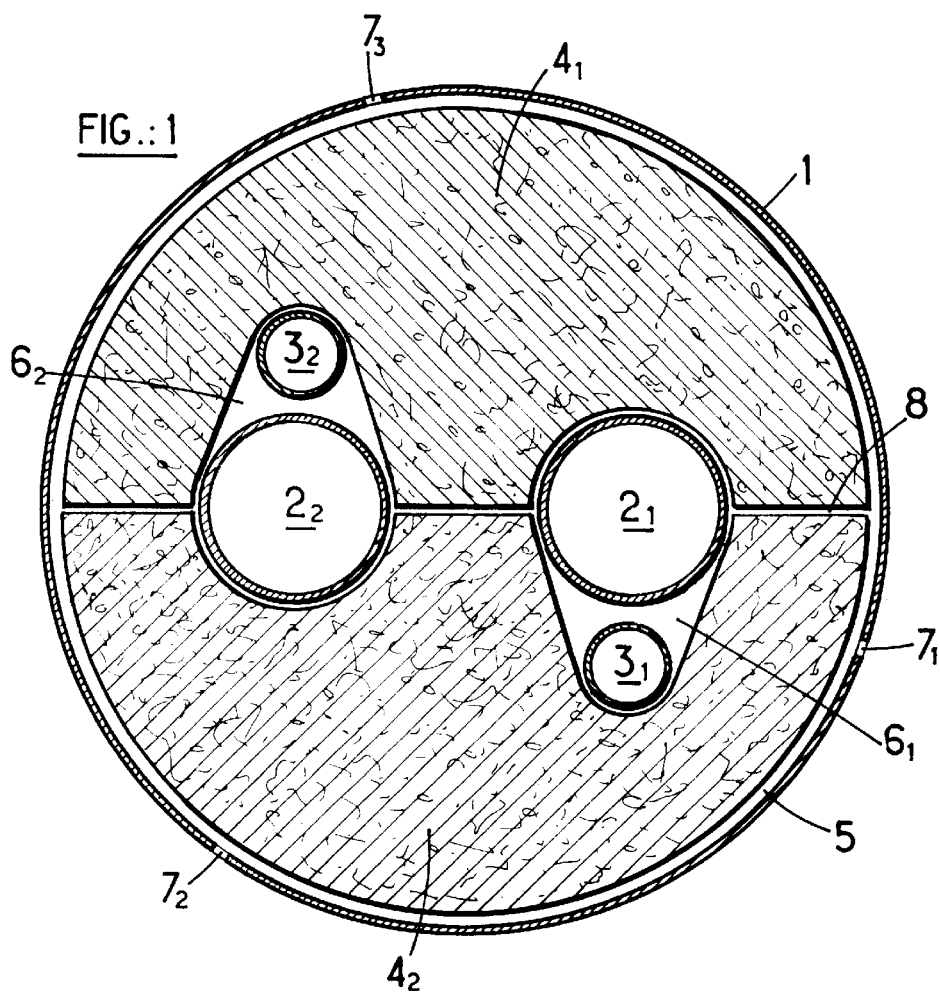
FIG.: 1
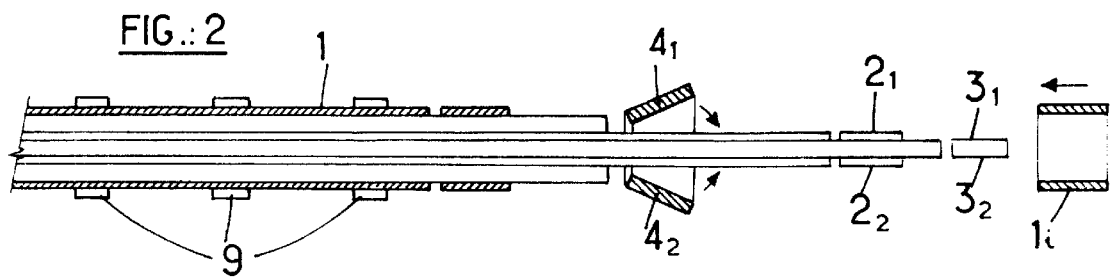
FIG.: 2

SUBMARINE PIPELINE FOR TRANSPORTING PETROLEUM PRODUCTS

This application is a Continuation of International PCT application No. PCT/FR98/02154 filed Oct. 8, 1998, which designated the United States.

BACKGROUND OF THE INVENTION

The present invention concerns an underwater pipeline for transferring petroleum products and more particularly a pipeline of the above kind comprising at least one flow line for the above products and a protective carrier pipe around said flow line. More particularly, the present invention concerns a pipeline of the above kind designed to be laid on -or near the sea floor at great depths, i.e. at depths of several hundred metres or more.

At these depths underwater wells usually produce liquid hydrocarbons, gaseous hydrocarbons and water simultaneously. At the low temperatures encountered at these great depths the multiphase mixture causes the formation of gas hydrates and paraffins that can block the flow lines in which it flows.

One solution to the problem of preventing blocking of the flow lines is to cover them with an external coating that adheres to the flow lines and is made from a thermally insulative material which also has the mechanical strength needed to withstand the high hydrostatic pressure encountered at great depths. In particular, composite products based on an epoxy resin, polyurethane or polypropylene, for example, are used for this coating. Such products are manufactured and sold by companies including Isotub (France), Balmoral Webco Pipeline Systems (Great Britain) and Bredero Price (USA), for example. By adjusting their composition it is possible to vary the density (and therefore the buoyancy), the mechanical strength, the coefficient of heat transfer, the thermal conductivity, for example. The high mechanical strength of the coating needed at great depths is accompanied by a great increase in the density of the material used, this increase in density having an adverse effect on its thermal insulation properties. The thickness of the coating must then be further increased to obtain the required thermal insulation, which renders this solution excessively costly at great depths. Also, the resistance to abrasion of such a coating is insufficient to allow flow lines installation by towing them along the sea floor.

Another technique known in itself for protecting underwater flow lines at great depths is to surround the flow lines with a conventional tubular protective carrier pipe capable of resisting the hydrostatic pressure. The flow lines protected by such a carrier pipe may be then installed by towing them into place. The carrier pipe can contain a plurality of flow lines, each having a thin thermal insulation coating of low density (polyurethane foam, polyethylene foam, glass wool, mineral wool, etc). At very great depths the steel carrier pipe cannot resist the hydrostatic pressure unless its thickness is increased out of all proportion, which increases the weight per linear metre to the detriment of buoyancy, which is necessary for towing it into place. In this latter case, which is well known in the art, the internal space of the sleeve between the coated flow line(s) and the sleeve itself is filled with an inert gas, for example nitrogen. The pressure of nitrogen in the sleeve must then be maintained throughout the service life of the flow lines, which can be 20 years or more. This constraint is costly because the initial pressurisation is costly and maintenance is difficult because the nitrogen slowly diffuses through the welds in the carrier pipe. Moreover, the pressure must be established during the construction of the pipeline on land, for example on a beach. The high pressure required can then cause a dangerous explosion of the carrier pipe. It is therefore necessary to increase the thickness of the carrier pipe which is detrimental to the buoyancy of the assembly, which is indispensable to towing it into place, as already mentioned.

SUMMARY OF THE INVENTION

The aim of the present invention is therefore to provide an underwater pipeline for transferring petroleum products designed in particular to be installed on or near the sea floor at great depths and having the required properties of mechanical strength, thermal insulation and buoyancy needed for towing it into place without the pipeline being subject to the problems of costs and safety referred to above in connection with the prior art.

The above aim of the invention, and others that will become apparent through the following description, are achieved by an underwater pipeline for transferring petroleum products comprising at least one flow line for such products and a protective carrier pipe around said flow line, said pipeline being remarkable in that it comprises a buoyancy module which is made of a thermally insulative material and is mechanically resistant to the hydrostatic pressure at the underwater site where the pipeline is installed. Also, the buoyancy module material is lighter than water to adjust the weight of the pipeline and to procure the required buoyancy.

The buoyancy module material is characterised by three fundamental properties: it thermally insulates the flow line (s) in the carrier pipe, it resists the external hydrostatic pressure and it procures the buoyancy of the pipeline assembly required for installation. As the pipeline design allows water to penetrate inside, the carrier pipe no longer has to withstand hydrostatic pressure at its installation site or internal gas pressure on land, and can have a relatively small wall thickness, which is beneficial to the buoyancy of the pipeline. The absence of high gas pressure inside the pipeline is beneficial to safety on the sites at which such pipelines are constructed and installed.

BRIEF DESCRIPTION OF THE DRAWINGS

FIG. 1 is a cross-sectional view of one embodiment of the pipeline of the invention, and FIG. 2 is a diagram illustrating a method of assembling and installing said pipeline.

DESCRIPTION OF A PREFERRED EMBODIMENT

The pipeline shown in FIG. 1 comprises a carrier pipe 1, for example made of steel, enclosing a plurality of flow lines $2_1$, $2_2$, $3_1$, $3_2$. By way of illustrative and non-limiting example, the flow lines $2_1$, $2_2$ can contain a multiphase mixture of petroleum products as described above and the flow lines $3_1$, $3_2$ can contain a fluid for heating the flow lines $2_1$, $2_2$ to prevent blocking of the flow lines by cooling of said mixture at great depths.

In accordance with the invention, the carrier pipe further contains a buoyancy module $4_1$, $4_2$ made of material combining good thermal insulation properties with very high mechanical strength such that its geometrical integrity is maintained when it is exposed to the very high pressures encountered on or near the sea floor at great depths, as explained below.

The thermal insulation properties of the material must be such that, in conjunction with the heating effect of the flow lines $3_1, 3_2$, it maintains the flow lines $2_1, 2_2$ at a temperature which prevents blocking of the flow lines.

Moreover, in accordance with the present invention, the space inside the carrier pipe 1 is intentionally not entirely filled by the buoyancy module material or by the flow lines $2_1, 2_2, 3_1, 3_2$ for construction reasons as explained below. This space is exposed to the hydrostatic pressure outside the carrier pipe. In the embodiment shown, this space includes the annular space 5 between the buoyancy module $4_1, 4_2$ and the pipe 1 and the axial voids $6_1, 6_2$ hollowed out from the buoyancy module material to accommodate the respective flow lines $2_1, 3_1$ and $2_2, 3_2$. As explained below, the voids $6_1, 6_2$ communicate with the annular space 5 and remain therefore at a pressure equal to the external hydrostatic pressure. The annular space 5 can be maintained by spacers (not shown) projecting from the periphery of the buoyancy module, for example.

In order to maintain equal the water pressure at the inside and outside faces of the carrier pipe 1, the pipe can be pierced with holes $7_1, 7_2, 7_3$ to establish fluid communication between these two faces, such holes being provided all along the pipeline.

Due to equalization of pressures at outside and inside faces of the carrier pipe the great thickness of the pipe is no longer required to resist the high pressures encountered at great depths. The carrier pipe role is limited to envelop the buoyancy module $4_1, 4_2$ and to protect it against abrasion. By using a relatively thin pipe 1 in accordance with the invention in conjunction with an appropriate buoyancy module material of appropriate density the pipeline can have a buoyancy suitable for towing it into place, as explained below.

In a preferred embodiment of the present invention the buoyancy module material is a "syntactic" composite product. A product of this kind differs from the materials mentioned in the preamble to this description in terms of composition, price and low density. It is constituted of microspheres, and possibly macrospheres, embedded in a matrix consisting of an epoxy resin, polyurethane or polypropylene, for example. These products are manufactured and sold by companies including BMTI (France), Balmoral Marine (Great Britain) and Emerson & Cuming (USA), for example. An appropriate choice of the composition of such material makes it possible to adjust its mechanical strength, its coefficient of thermal transfer and its buoyancy to suit the performance required for its use as the buoyancy module $4_1, 4_2$. Moreover, it is well known that, for the same thermal specifications, the above material is much cost-effective than those mentioned in the preamble of the present description.

With regard to its mechanical strength, the material must be able to withstand the pressure encountered at the installation site. This pressure can correspond to great depths of water and be as high as 250 bars, for example.

With regard to the coefficient U of thermal transfer, expressed in $W/m^2 \cdot °C$., insulating a pipeline at great depths requires U values to be in the range of 2 or less in order to ensure the economic way of control of the pipeline temperature.

With regard to the buoyancy of the pipeline, to allow it to be towed into place, apparent weights in water in the order of 5 to 30 kg per linear metre are required if the pipeline is laid on the sea floor, or in the order of −5 to −20 kg per linear metre if the pipeline floats above the sea floor. With the above values sections of pipeline several kilometres long can be towed by existing tugs of moderate power rating (bollard pull of approximately 80 tonnes). Obviously the buoyancy module material used must then be lighter than water.

Syntactic products meet the above constraints. They can also be moulded, enabling the buoyancy module to be constructed by lining up pairs of half-shells $4_1, 4_2$ surrounding the flow lines $2_1, 2_2, 3_1, 3_2$, as shown in FIG. 1. When the half-shells are moulded, channels are formed in them to delimit the voids $6_1, 6_2$ after the half-shells are assembled together. These voids are in fluid communication with the annular space 5 through assembly interstices 8 between the half-shells. The voids $6_1, 6_2$ remain therefore at a pressure equal to the high hydrostatic pressure at the sea floor. However, they are very well insulated thermally from the external environment by the half-shells $4_1, 4_2$ which advantageously confine the heat generated by the heating lines $3_1, 3_2$ which heat the flow lines $2_1, 2_2$ by conduction.

Refer now to the FIG. 2 diagram, which illustrates the various phases of assembling and installing the pipeline in accordance with the invention. The assembly can be carried out on a bank or on a beach, for example. The first step is progressive assembly by butt welding sections of flow lines $2_1, 2_2$ and $3_1, 3_2$, each having a length of 12 metres, for example, followed by finishing the ends such as covering the flow lines with an anticorrosion protection material. A bundle is made up combining the flow lines $2_1, 2_2, 3_1, 3_2$. Pairs of half-shells 41, 42 are then butt joined one after the other around the newly assembled bundle of flow lines. A section $1_i$ of the carrier pipe 1 is threaded over the last pair of half-shells and welded to the preceding section. The pipeline assembled in this way is then fitted with corrosion protection anodes 9, if necessary. The operation is repeated as many times as necessary to form the required length of pipeline ready for towing to the final installation site.

It is now apparent that the invention achieves the stated aim, namely to allow, in an economic manner, the manufacture and the installation at great depth of a submarine pipeline for transferring petroleum products, such a pipeline having the required thermal insulation, mechanical strength and buoyancy specifications.

Of course, the invention is not limited to the embodiment described and shown which has been given by way of example only. For example, water could be introduced into the sleeve from one end rather than through holes all along its length. The carrier pipe could be made of a material adapted to collapse onto the buoyancy module due to the external hydrostatic pressure. No holes are then pierced in the carrier pipe. The annular space 5 is filled in when the pipe collapses. The resulting deformation of the carrier pipe is without consequences, as the pipe provides only protection against abrasion and facilitates assembly, as mentioned above.

FIG. 1 shows the buoyancy module made up of pairs of half-shells. Clearly the successive sections of the buoyancy module could be made up of groups of a different number of complementary shells.

Similarly, the invention is not limited to protecting flow lines such as the flow lines $2_1, 2_2$, and $3_1, 3_2$ shown in the drawing. Obviously, it encompasses pipelines containing any number of flow lines and service lines, which can also include power supply lines and control lines of well heads installed on the sea floor.

Materials other than the above syntactic materials could be used for the halfshells, provided that they have the required thermal insulation, mechanical strength and buoyancy properties. Thus other composite materials could be used for this purpose, such as rubber, neoprene, or a honeycomb structure material.

Similarly, the carrier pipe could be made from other conventional materials, such as PVC or a glassfibre reinforced plastics material.

What is claimed is:

1. Underwater pipeline for transferring petroleum products comprising at least one flow line for such products a protective permeable carrier pipe around said flow line, a buoyancy module of a thermally insulative material mechanically resistant to the hydrostatic pressure at the underwater site at which the pipeline is installed, said buoyancy module being exposed, inside said carrier pipe, to a water pressure equal to the external hydrostatic pressure.

2. A pipeline according to claim 1, wherein said buoyancy module is made from a material that is lighter than water.

3. A pipeline according to claim 1, wherein the carrier pipe is pierced with holes to establish water communication between its inside and outside faces.

4. A pipeline according to claim 1, wherein at least one axial void for said flow line is hollowed out in the buoyancy module, said void remaining at a pressure equal to the external hydrostatic pressure.

5. A pipeline according to claim 4, wherein said axial void is shaped so that it can also receive a service line.

6. A pipeline according to claim 5, wherein said service line is a heating line for heating said flow line by conduction.

7. A pipeline according to claim 5, wherein said service line is a power supply line of an underwater well head.

8. A pipeline according to claim 5, wherein said service line is a control line of an underwater petroleum products well.

9. A pipeline according to claim 1, wherein the buoyancy module is constituted of groups of complementary shells butt jointed one after the other.

10. A pipeline according to claim 9, wherein the shells of the same group have channels hollowed into them which form together a section of said axial void.

11. A pipeline according to claim 1, wherein said buoyancy module is constituted of a material selected from the group comprising: a syntactic material, a composite material, a rubber, a neoprene, a honeycomb structure material.

12. A pipeline according to claim 1, wherein said carrier pipe is made from a material selected from the group comprising: PVC, a glassfibre reinforced plastics material.

* * * * *